UNITED STATES PATENT OFFICE.

JOHN L. CURTIS, OF CHICAGO, ILLINOIS.

COMPOUND OR COMPOSITION OF MATTER.

SPECIFICATION forming part of Letters Patent No. 621,797, dated March 28, 1899.

Application filed June 18, 1898. Serial No. 683,854. (No specimens.)

*To all whom it may concern:*

Be it known that I, JOHN L. CURTIS, a citizen of the United States, residing at Chicago, in the county of Cook and State of Illinois, have invented a certain new and useful Compound or Composition of Matter, of which the following is a full, clear, and exact specification.

My invention relates to an improved composition of matter for the construction of antifriction-bushings, &c., and molds for casting metals and the like; and my invention has for its object to provide a composition of matter that will possess a maximum degree of rigidity and hardness and at the same time be of an antifriction character or self-lubricating and one which will become porous when subjected to a high degree of heat and will therefore be appropriate for casting metals and carrying off the gases arising during the casting operation.

In making my compound I employ the following ingredients: graphite, mica, chalk or magnesia, an oily paste—such as paraffin-wax or beeswax or tallow—asbestos, and soluble glass. Of the graphite, mica, chalk, and paraffin-wax I employ equal proportions and about six times as much of the asbestos as each of the others. This mass is mixed together and ground to thoroughly incorporate the ingredients, and then a sufficient quantity of the soluble glass is added to make a paste of the mass. After the mass has been thoroughly kneaded or worked it may be molded into the desired shape and dried by either natural or artificial heat.

I prefer to use all of the above ingredients, as above specified; but a reasonably-good compound might be produced without the graphite, or if the graphite is used the mica might be omitted. The graphite is employed for its well-known lubricating qualities; but the mica, while it possesses the same quality, also possesses the further quality of preventing the mass from crumbling. The purpose of the chalk, which is very essential, causes the mass to solidify, so as to withstand great pressure without being compressed while in a plastic state. The paraffin-wax, beeswax, or tallow fills the pores of the compound, and when the compound is used as an antifriction-bushing the heat of the moving journal or other part to be lubricated causes slight exudation of the wax or tallow, which collects on the surface of the compound in the form of a very glossy and hard surface, affording but a minimum of friction, and when the compound is used for molding metals the heat of the hot metal burns out or expels the paraffin or beeswax and tallow and leaves the compound more or less porous, and consequently provides for the escape of the gases arising from the hot metal, and thus avoids fracture of the mold. The purpose of the asbestos fiber is to provide tenacity and adhesion of the particles.

Having thus described my invention, what I claim as new therein, and desire to secure by Letters Patent, is—

1. The herein-described compound or composition of matter comprising graphite, chalk, an oily paste, asbestos fiber and soluble glass, substantially as set forth.

2. The herein-described compound or composition of matter comprising graphite, mica, chalk, wax, asbestos fiber and soluble glass, substantially as set forth.

3. The herein-described compound or composition of matter comprising graphite, mica, chalk, paraffin-wax, asbestos fiber and soluble glass, substantially as set forth.

JOHN L. CURTIS.

Witnesses:
EDNA B. JOHNSON,
F. A. HOPKINS.